(12) United States Patent
Lavelle et al.

(10) Patent No.: US 8,238,407 B1
(45) Date of Patent: *Aug. 7, 2012

(54) HIGH-FREQUENCY WIRELESS PERIPHERAL DEVICE WITH AUTO-CONNECTION AND AUTO-SYNCHRONIZATION

(75) Inventors: Mark Thomas Lavelle, San Mateo, CA (US); Hugues Michel Favey, Fremont, CA (US); David Ernest Wegmuller, Union City, CA (US); Eric Schmid, Sunnyvale, CA (US); Patrick Paul Loughnane, Newark, CA (US)

(73) Assignee: Logitech Europe S.A., Morges (CH)

( * ) Notice: Subject to any disclaimer, the term of this patent is extended or adjusted under 35 U.S.C. 154(b) by 199 days.

This patent is subject to a terminal disclaimer.

(21) Appl. No.: 12/648,283

(22) Filed: Dec. 28, 2009

Related U.S. Application Data

(63) Continuation of application No. 11/772,719, filed on Jul. 2, 2007, now Pat. No. 7,664,162, which is a continuation of application No. 10/081,724, filed on Feb. 20, 2002, now Pat. No. 7,254,159.

(51) Int. Cl.
  *H04B 1/69* (2011.01)

(52) U.S. Cl. ........ 375/141; 375/133; 375/132; 375/140; 370/328; 370/254; 370/338

(58) Field of Classification Search .................. 375/141, 375/133, 132, 140; 370/328, 254, 338
See application file for complete search history.

(56) References Cited

U.S. PATENT DOCUMENTS

| | | | |
|---|---|---|---|
| 6,560,443 B1* | 5/2003 | Vaisanen et al. ................ 455/73 |
| 7,177,287 B1* | 2/2007 | Herring et al. ................ 370/280 |
| 7,787,447 B1* | 8/2010 | Egan et al. .................... 370/389 |
| 2007/0104259 A1* | 5/2007 | Herring et al. ................ 375/219 |
| 2010/0246430 A1* | 9/2010 | Egan et al. .................... 370/252 |

* cited by examiner

*Primary Examiner* — Eva Puente
(74) *Attorney, Agent, or Firm* — Kilpatrick Townsend & Stockton LLP

(57) ABSTRACT

Automatic establishment of a connection between a human interface device and a host transceiver unit. A marriage ID is exchanged in a synchronization step. The marriage ID being used by both the host transceiver and the human interface device to calculate a spread spectrum modulation pattern. In one embodiment the spread spectrum modulation is a frequency hopping spread spectrum modulation.

23 Claims, 3 Drawing Sheets ns thereon, wherein the instructions include routines for synchronizing the host transceiver unit and the human interface device for wirelessly exchanging data between the host transceiver unit and the human interface device at a spread spectrum modulation pattern which is determined by the host transceiver after the host transceiver unit and the human interface device have acknowledged each other's presence.

HIGH-FREQUENCY WIRELESS PERIPHERAL DEVICE WITH AUTO-CONNECTION AND AUTO-SYNCHRONIZATION

CROSS-REFERENCES TO RELATED APPLICATIONS

This application is a continuation of U.S. patent application Ser. No. 11/772,719, filed Jul. 2, 2007, entitled "High-Frequency Wireless Peripheral Device With Auto-Connection and Auto-Synchronization," which application is a continuation of U.S. patent application Ser. No. 10/081,724, filed Feb. 2, 2002, entitled "High-Frequency Wireless Peripheral Device With Auto-Connection and Auto-Synchronization," which application is related to U.S. patent application Ser. No. 10/081,876, entitled "Power Management for Wireless Peripheral Device with Force Feedback," filed on Feb. 2, 2002, which applications are herein incorporated by reference.

BACKGROUND OF THE INVENTION

The present invention relates to wireless peripheral devices, and in particular to wireless peripheral devices in communication with an intelligent host. More particularly the present invention is related to the establishment of the connection between the peripheral device and the intelligent host as well as the power management aspects of the wireless peripheral device.

Many peripheral device vendors have decided to cut the cord that connects the peripheral device with its host. For example, many vendors presently offer wireless peripheral devices such as wireless keyboards and computer input devices such as computer mice. Some have also provided wireless game controllers. The wireless game controllers typically communicate over a fixed 900 MHz band or via an infrared link. Infrared links require the device to be in the line of sight of its host to properly interface with the host, and thus is prone to losing connectivity. While the 900 MHz devices are an improvement over the infrared-type wireless devices, these devices have several shortcomings. For example, the prior art peripheral devices typically come prematched with a receiver, exchange data over a predefined and fixed frequency band and require the manual activation of a connect button to establish a wireless link between the peripheral device and its host. The fixed frequency operation of the devices, especially at the lower 900 MHz band are prone to interference problems from other consumer devices operating in the same frequency range.

Furthermore, these wireless devices typically require alkaline or rechargeable batteries as their power source. In addition, the ongoing incorporation of force feedback technology places bigger demands on battery life, by requiring power for the motors which play back the force effects. Efficient use of battery power, prolonged and predictable battery life and predictable device performance, while providing the user with sufficient feedback feel are essential features of any wireless peripheral device. Superior delivery of these features is likely to provide a peripheral device provider with the competitive edge needed to compete commercially with other competing products.

There is therefore a need for an improved and energy efficient wireless peripheral device.

BRIEF SUMMARY OF THE INVENTION

The present invention provides a system and methods for the automatic establishment of a connection between a human interface device and a host transceiver unit, wherein the system includes a host transceiver unit configured to be connected with a host via a bus, and configured to wirelessly exchange data with a human interface device; a human interface device configured to wirelessly exchange data with a host transceiver; and a computer readable media having instructions thereon, wherein the instructions include routines for synchronizing the host transceiver unit and the human interface device for wirelessly exchanging data between the host transceiver unit and the human interface device at a spread spectrum modulation pattern which is determined by the host transceiver after the host transceiver unit and the human interface device have acknowledged each other's presence.

In one embodiment of the present invention, the routines for synchronizing the host transceiver and the human interface device include the broadcasting of a first signal at a first broadcasting pattern by the host transceiver unit in response to powering up the host transceiver unit, wherein this first signal is intended to be received by a human interface device. Additionally, the routines for synchronizing the host transceiver unit and the human interface device include routines for causing the human interface device to switch to broadcasting at a broadcast spread spectrum pattern matching that of the host transceiver unit after a receipt of a signal transmitted by the host transceiver unit by the human interface device, thus synchronizing said host transceiver unit and said human interface device.

Furthermore, embodiments of the present invention provide a method and a system wherein the host transceiver unit is configured to broadcast at one of a plurality of host spread spectrum broadcast patterns, each of which is a function of the host communication state; and wherein the human interface device is configured to broadcasts at one of a plurality of device spread spectrum broadcast patterns, which are a function of the device communication state; and wherein the host transceiver unit and the human interface device broadcast at a same spread spectrum broadcast pattern after the host receiver and the human interface device have acknowledged each other's presence.

For a further understanding of the nature and advantages of the invention, reference should be made to the following description taken in conjunction with the accompanying drawings.

DETAILED DESCRIPTION OF THE INVENTION

Basic System

Figure 1:
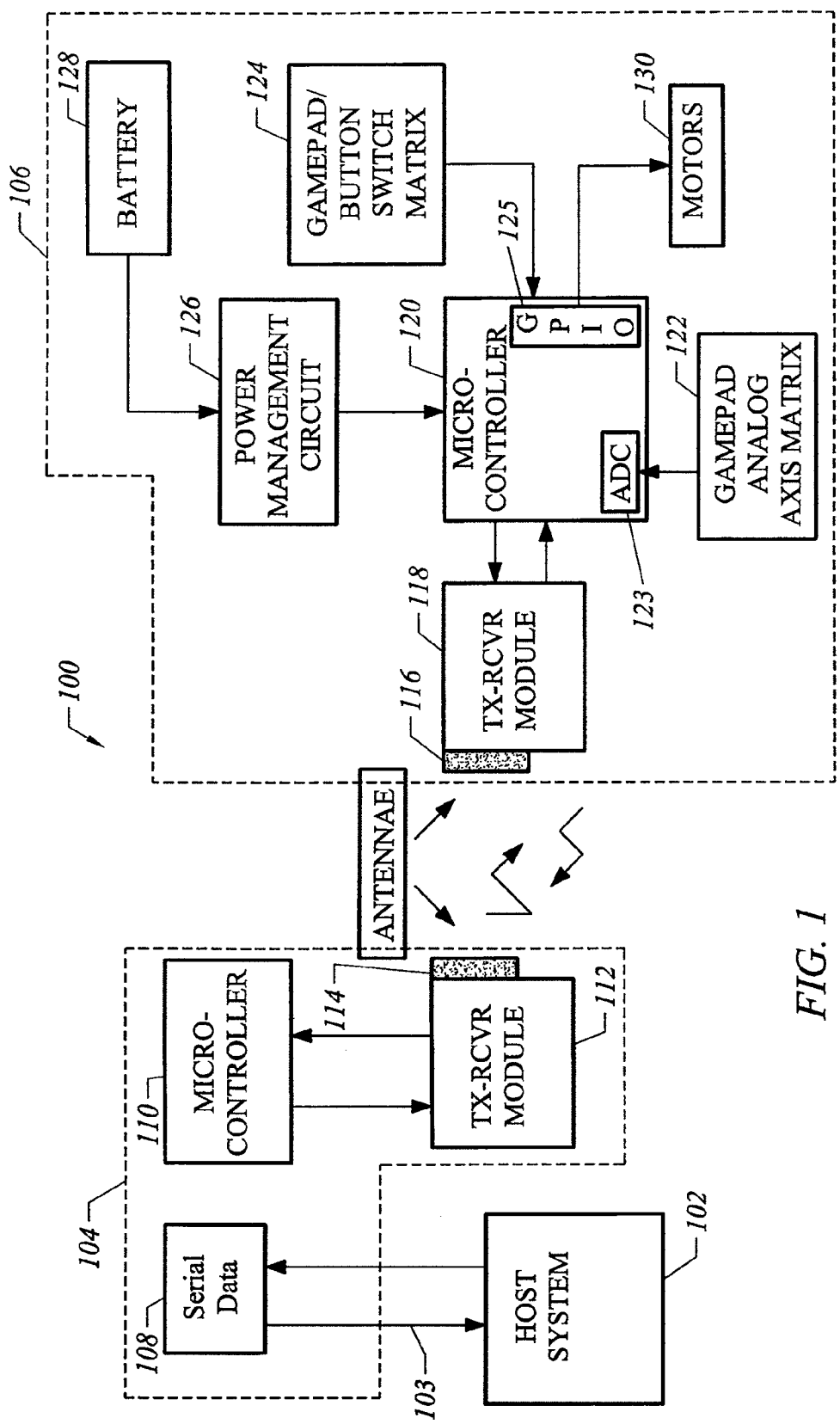
FIG. 1 is a block diagram of the cordless Human Interface Device (HID) ("slave") and the host receiver ("master") incorporating the present invention.

FIG. 1 is a block diagram 100 of the cordless Human Interface Device (HID) ("slave") 106 and the host transceiver ("master") unit 104 incorporating the present invention. The wireless HID slave device 106 communicates in a bi-directional manner with the host transceiver unit 104 via a wireless radio frequency (RF) link. In an exemplary embodiment, the wireless communication is carried over a 900 MHz frequency range and preferably over a 2.4 GHz frequency range. In other embodiments, the wireless communication is carried over other alternate or regionally available frequency ranges. The host transceiver 104 is connected via a communication bus 103 with an intelligent host 102. The intelligent host 102 is enabled to execute an application program, which is configured to exchange data with various input and interaction devices, including the HID 106. Data sent over the RF link may include HID input data for incorporation by a host application program (not shown) executing at the intelligent host 102. Furthermore, data sent over the RF link may include commands originating at the host 102 for execution by the HID 106. The various embodiments of the host 102 may include a personal computer, an interactive game console, a television set top box, a network computer, a workstation, a server, a router, a switch, a hub, a bridge, a network appliance, or any other intelligent host device where images, audio and data are displayed, further processed locally or over a network. The HID 106 includes a keyboard, a computer mouse, a computer trackball, an interactive gaming controller such as a joy stick, a wheel or a gamepad. The HID 106 includes an electronic camera or may optionally include actuation devices such as motors, magnets, linkages, and such for the imparting of force feedback feel effects to the operator holding the HID 106. The bus 103, may be a universal serial bus (USB), or an IEEE 1394 bus, or a parallel port, or other suitable communication link.

The host transceiver unit 104 includes a data serializer 108 such as an UART or other equivalent hardware or firmware enabled-device to convert the data stream being exchanged with the host 102 into a serial data stream. The data serializer 108 is coupled to a processor 110, such as a microcontroller. The microcontroller 110 or alternately microprocessor processes all data being exchanged between the host 102 and the transceiver module 112. In one embodiment, the transceiver module 112 is a commercially available 2.4 GHz transmit/receive module. Alternately, the transceiver module 112 is a commercially available 900 MHz transmit/receive module. Further alternate embodiments, use other commercially available transceiver modules communicating over other available frequency ranges. The transceiver module 112 prepares data for wireless exchange between the host transceiver unit 104 and the HID 106 via transceiver antenna 114. Memory (not shown) is provided to enable the storage of data for use in conjunction with the microcontroller 110 and transceiver module 112. One embodiment of the memory includes read and write memory (e.g., RAM). This memory stores data and program instructions for execution by the processor 110, and stores temporary or other intermediate information during the operation of the processor. An embodiment of the memory also includes a read only memory (ROM) for storing information and instructions for the processor 110. ROM memory also stores the firmware instructions necessary for the operation of the host transceiver unit 104. In addition to the RAM and the ROM memory devices, FLASH, EEPROM and other memory arrays as deemed suitable may also be used.

Data being sent or received by transceiver antenna 114 is received or sent by the HID antenna 116 on the HID module 106. In the description that follows the HID module includes a gamepad enabled to play back force-feedback effects issued from an application program being executed by the host. This gamepad embodiment is used for the description herein, since it includes input buttons 124, a mini joy stick 122, as well as motors 130 and associated linkages (not shown) and thus allows for a more comprehensive description of the functionality of a wireless HID in accordance with the embodiments of the present invention. This is for exemplary purposes only and is not meant to limit the scope of the claimed invention to only such an HID as other HIDs are within the scope of the present claimed invention. The HID antenna 116 is in turn coupled with the HID transceiver 118. HID transceiver 118 prepares data for transmission from the HID 106, and also prepares data received from the host transceiver unit 104 for further processing by the HID microcontroller 120. Alternately, an HID microprocessor 120 may be used in place of the HID microcontroller 120. HID microcontroller 120 is enabled to receive various inputs. HID microcontroller 120 receives input from an operator manipulating a mini joy stick. An operator's input using the mini joy stick is provided to the HID microcontroller 120 via the gamepad analog axis matrix 122. The analog signal provided by the gamepad analog axis matrix is converted to digital by the analog to digital converter 123. The HID microcontroller 120 also received operator input from various push button operations. The push button input data is provided to the HID microcontroller 120 via the gamepad button/switch matrix 124. Data is read in from the gamepad button switch matrix via the general purpose input output (GPIO) interface 125 of the HID microcontroller 120. Optionally, an appropriate analog to digital converters is used to convert analog push button inputs to digital signals. HID microcontroller 120 also sends drive commands to motors 130 via the same GPIO interface 125 for the playback of force-feedback effects. Battery module 128 is coupled with the power management circuit 126 which is configured to provide regulated power for the operation of the HID 106. The power management aspects of the HID are described in further detail below. A memory device (not shown) is provided to enable the storage of information for use in conjunction with the microcontroller 120 and transceiver module 118. One embodiment of the memory device includes read and write memory (e.g., RAM). This memory stores data and program instructions for execution by the processor 120, and stores temporary or other intermediate information during the operation of the processor. An embodiment of the memory also includes a read only memory (ROM) for storing information and instructions for the processor 120. ROM memory also stores the firmware instructions necessary for the operation of the HID 106. In addition to the RAM and the ROM memory devices, FLASH, EEPROM and other memory arrays as deemed suitable may also be used.

Communication Protocol

The communication protocol for the HID in accordance with the present invention supports communication between a single host transceiver ("master") and a single HID ("slave"), and is designed to allow multiple master/slave pairs to operate in close proximity on a single host.

In one embodiment of the present invention, transceivers are spread spectrum transceivers. Spread spectrum transceivers utilize spread spectrum modulation to modulate signals. Spread spectrum modulation spreads a relatively narrow band of transmitted frequency over a broad band with lower energy content to minimize noise and interference. More specifically, spread spectrum transceivers utilize a form of radio transmission in which the signal is distributed over a broad frequency range. This distribution pattern is based on either direct sequence coding or frequency hopping. In direct sequence coding, the information to be transmitted is modified by multi-bit binary codes, which spreads the signal out over a broader frequency range. The receiver knows the codes and thus it can decode the receiver signal. Alternately, in frequency hopping, a transmitter transmits at a particular frequency for a short time interval, then switches to another frequency for another short interval, and so on. The random frequency selection sequencing is determined by one of the transmitter or receiver and both transceivers follow the same sequencing.

In one embodiment, the communication is enabled between two 2.4 GHz transceivers—a master (host system end transceiver) and a slave (HID end), and the transmission is conducted via FSK modulation over the 2.4 GHz band, using a commercially available transceiver module using a channel-hopping algorithm. This communication protocol is adaptable to any method of data serialization that can be sent and received. With appropriate adjustments to the time division multiplexing "slot" length and the number of hopping channels (or no hopping at all), the communication protocol is useable with any microcontroller and in different RF bands. Alternately, the transmissions are carried out over a 900 MHz band using a commercially available transceiver module, or other frequency bands that may be available.

In one embodiment, the one-to-one master/slave relationship is maintained by requiring that each master "marry" an individual slave by sharing a random 8-bit "Marriage ID" and, once married, only communicate with that one slave. Alternately, other embodiments use a Marriage ID having more or less data bits. RF interference between different master/slave pairs is eliminated or minimized by the fact that all master/slave pairs are channel hopping, with different pairs using different hopping patterns, because the hop pattern is calculated using the unique "Marriage ID." Bi-directional communication is enabled by the use of synchronized time slots during which the master and slave each have an opportunity to transmit for up to half of the slot period for time division multiplexing. This bi-directional communication is described in further detail below in conjunction with FIG. 4.

Communications States

Masters and slaves start operation in the "Scan" state, with the goal of finding and synchronizing with an appropriate "mate." Synchronization is achieved when the slave receives multiple master pings and responds to the pings, over a slave frequency hopping pattern which is the same as the master's. The term ping as used herein is as it is understood by those of skill in the art, where a ping is program that bounces a request off of another device to see if another device is still responding. If the master is not currently married or the user presses the "Connect" button on the master, it tries to synchronize using the reserved Proposal ID. Once synched, a master device generates and assigns a MID to the slave device for subsequent communication between the master and slave devices. If the master is currently married, it will attempt to synchronize using the MID of its mate.

In the Scan state the slave listens for a master that is pinging with an appropriate ID (e.g., proposal ID). To ensure that only the correct devices synchronize, a slave with a MID other than the Proposal ID will only respond to the Proposal ID if it sees the Proposal ID a certain number of times (e.g., three) without seeing its own MID. This ensures that a slave device that has previously been married can still connect with a master whose connect button has been pressed. Scanning devices that share a MID (including the Proposal ID) move to the Connected state.

In the case of a successful proposal connection (i.e., successful synchronization), the master generates a random 8-bit marriage token, or MID which is passed to the slave in a "Request" and stored in non-volatile memory on both the master and slave, completing the wedding.

Figure 2:
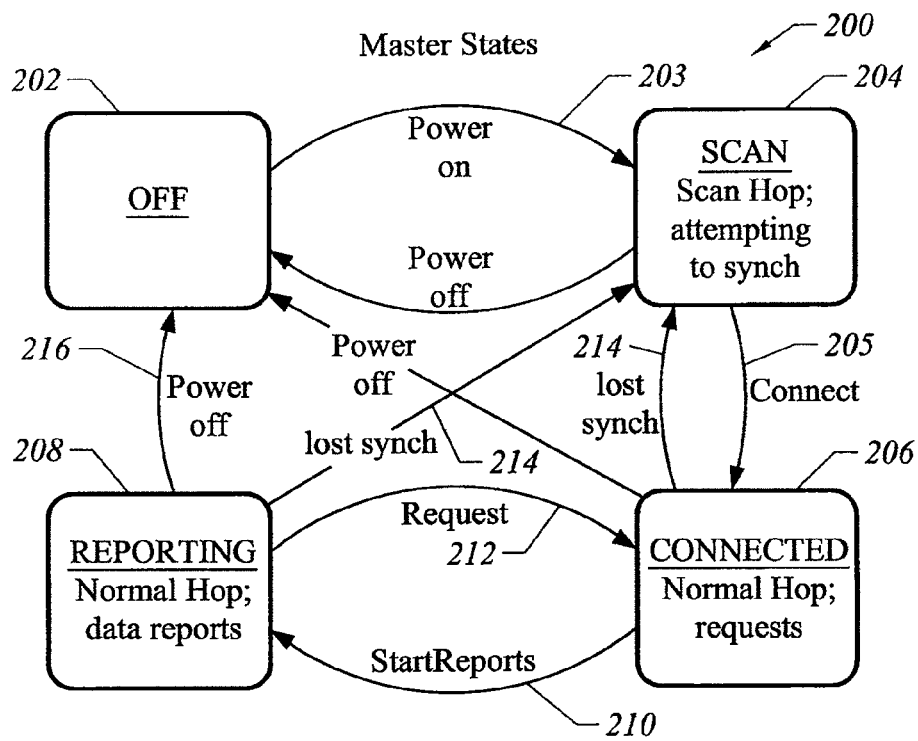
FIG. 2 is a state diagram for the master device (host end of RF link) showing the communications states within which the master device operates.

FIG. 2 is a state diagram 200 for the master device (host end of RF link) showing the communications states within which the master operates. The master device moves between states as shown on FIG. 2. Initially, the master device is connected with a host. In this initial state the host is powered off, and hence the master device is in the off state (202). Once the master device is powered on (e.g., the host device is turned on) (203), the master device moves to the scan state (204). In the scan state, the master device is frequency hopping in a scan hop mode, sending a proposal ID (or the MID of its mate) and attempting to marry or synch with a slave device. If a slave device acknowledges the pinging of the master device, the master (and slave) move (e.g., connect [205]) to the connected state (206). In the connected state (206), the master device broadcasts in the normal hop mode. Once a master has moved to the connected state it then moves to the reporting state (208), wherein the reporting state is a sub-state of the connected state (206). In the reporting state (208), the master device is frequency hopping in the normal mode. The transmittal of a "StartReport" packet (210) by the master device, starts the exchange of data between the master and the slave devices for sending and receiving position/button and motor data reports, and thus moves the slave and the master device to the Reporting state (208) from the connected state (206). StartReports (210) packets are sent by the master to tell the slave to go from the Connected state (206) to the Reporting state (208). StartReports packets (210) are valid only in the Connected state (206). Request packets (212) serve the same function as the Setup phase of USB Control transfers. They are sent only by the master, and are valid only in the Connected state (receipt of a Request by a slave in the Reporting state causes the slave to stop reporting and revert to the Connected state). When the devices are Connected and there is no request activity, the slave echoes periodically (e.g., every fourth Tick packet) back to the master. The periodic echo rate is a variable and can be more or less that every fourth packet, in different embodiments. This allows the master to detect and act on any loss of synchronization without excessive delay. "Lost synch" (214) is a condition defined by a predefined number of (e.g., five) consecutive attempts at communication with no response. In other words, if either device (i.e., master or slave) expects a packet from the other and that packet is not detected at the expected time (e.g., in five consecutive occasions) the device will revert to the Scan state (204). The expected packet and time depends on the current state and protocol stage. Lastly, the shutting down or powering off the host (216), will return the master to the off state (202).

Figure 3:
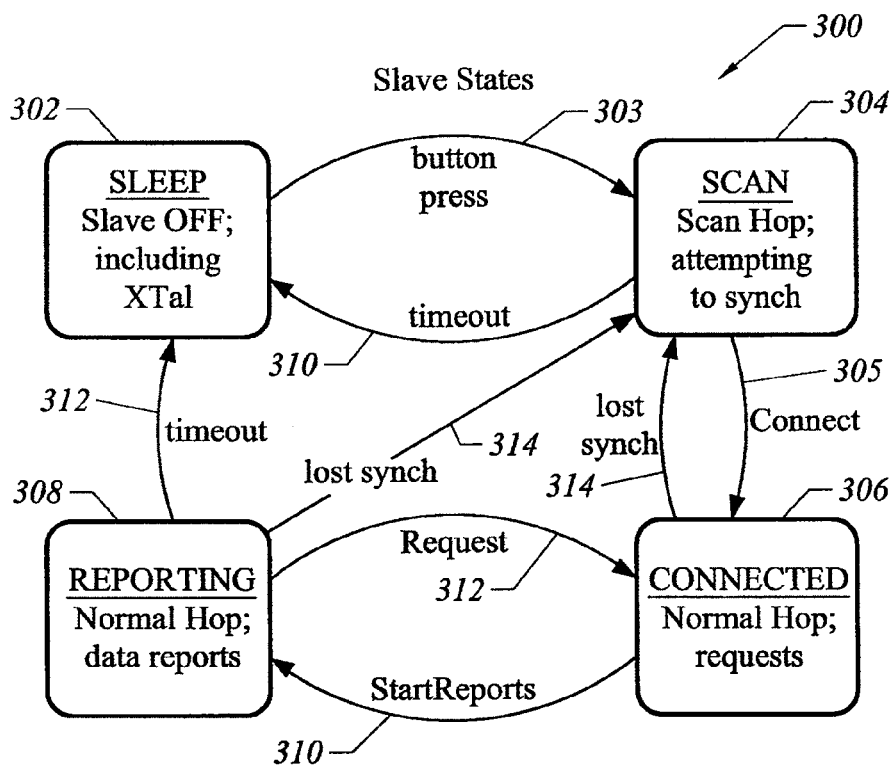
FIG. 3 is a state diagram for the slave device (HID) showing the communications states within which the master device operates.

FIG. 3 is a state diagram 300 for the slave device (HID) showing the communications states within which the slave device operates. The slave device moves between states as shown on FIG. 3. The move from the Scan state (304) to the Connected state (306) occurs in conjunction with the master device, as described above. Initially, the slave device is in a Sleep state (302) where the slave device is off. The pressing of any button on the slave device (303) will move the slave device to the Scan state (304). In the scan state, the slave device is frequency hopping in a scan hop mode, and attempting to synchronize with the master by listening for the master's pings and acknowledging the master's pings. If a slave device acknowledges the pinging of the master device, the master (and slave) move (e.g., connect [305]) to the connected state (306). In the connected state (306), the slave device broadcasts in the normal hop mode. Once a slave has moved to the connected state it then moves to the reporting state (308), which is a subset of the connected state (306). In the reporting state (308), the slave device is frequency hopping in the normal mode. The transmittal of a StartReport packet (310) by the master device, starts the exchange of data between the master and the slave devices for sending and receiving position/button and motor data reports, and thus moves the slave and the master device to the Reporting state (308) from the connected state (306). StartReports (310) packets are sent by the master to tell the slave to go from the Connected state (306) to the Reporting state (308). StartReports packets (310) are valid only in the Connected state (306). Request packets (312) serve the same function as the Setup phase of USB Control transfers. They are sent only by the master, and are valid only in the Connected state (receipt of a Request by a slave in the Reporting state causes the slave to stop reporting and revert to the Connected state). When the devices are Connected and there is no request activity, the slave echoes periodically (e.g., every fourth Tick packet) back to the master. This allows the master to detect and act on any loss of synchronization without excessive delay. "Lost synch" (314) is a condition defined as a predefined number of (e.g., five) consecutive attempts at communication with no response. In other words, if either device (i.e., master or slave) expects a packet from the other and that packet is not detected at the expected time (e.g., in five consecutive occasions) the device will revert to the Scan state (304). The expected packet and time depends on the current state and protocol stage. Lastly, if the slave device is inactive for a specified time period, the slave device times out (312) and the slave device reverts back to the Sleep state (302). In one embodiment, "timeout" is defined as 10 seconds in the Scan state without detecting a master (pinging with either the device's MID or the Proposal ID) or 45 seconds in the Reporting state with no user activity (button presses or axis motion). Alternate embodiments, use different time periods to define a timeout event when in Scan or a Reporting states.

Figure 4:
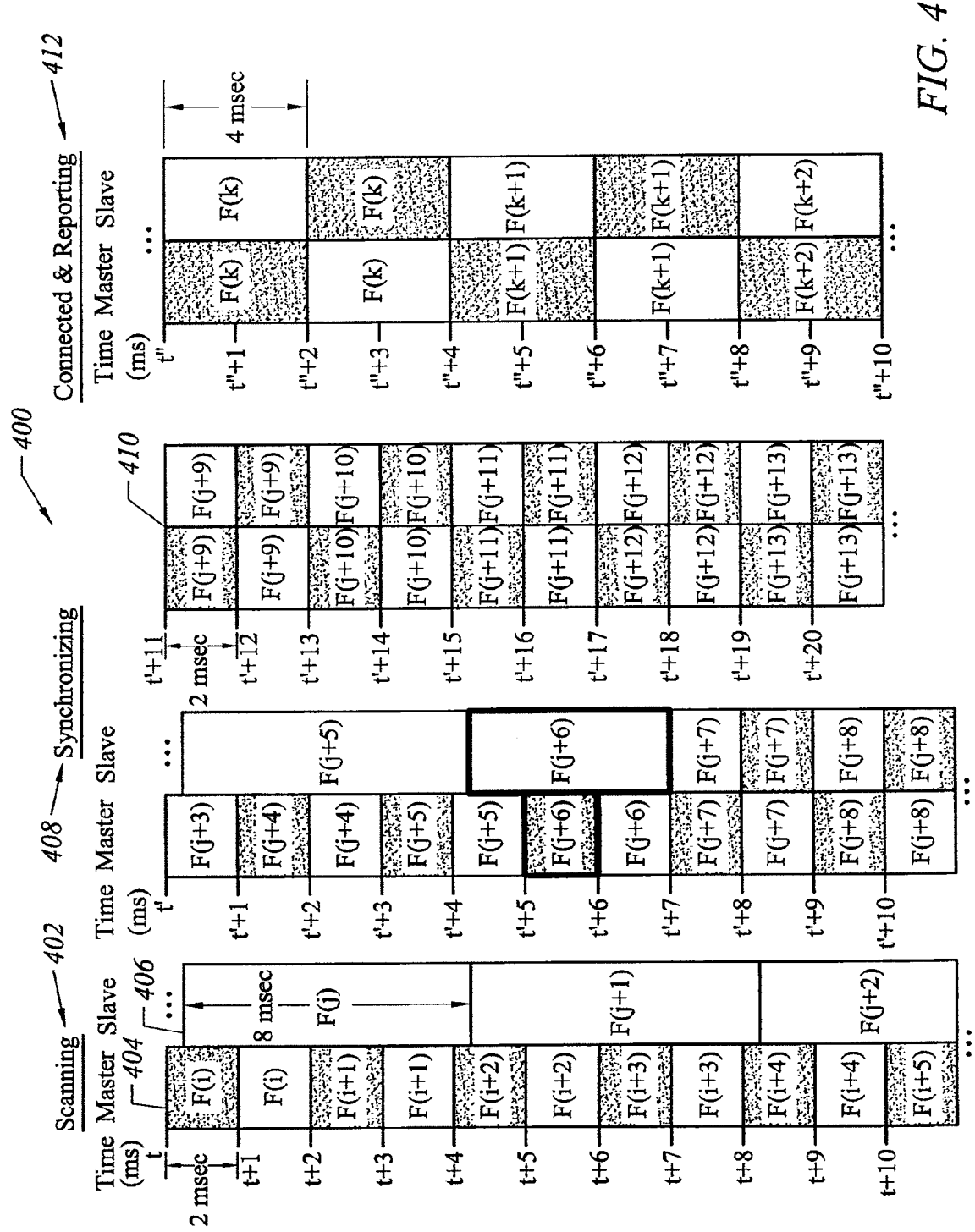
FIG. 4 is a diagram illustrating an embodiment of the channel hopping sequences during various communications states for the master and the slave devices.

FIG. 4 is a diagram 400 illustrating an embodiment of the channel hopping sequences during various communications states for the master and the slave devices. Transmit periods are shaded, while receive periods are not. Note that a device is not necessarily transmitting for any or all of its entire transmit period, and may "listen" for longer than the receive period. "F(i)" indicates the transmit/receive frequency for the period. In one 2.4 GHz implementation, there are 79 channels (0 . . . 78), wherein each channel is 1 MHz apart. The master and slave distribute their communications among these channels by "hopping" from channel to channel in a random sequence of time slots that depends upon the current state (e.g., scanning, synchronizing or Connected and Reporting states) and the Marriage ID. For convenience, all hopping/slot times in the remainder of this description are specified in milliseconds, but they are actually implemented as multiples of 1024 μs. In other words, a "4 ms" slot is actually 4096 μs long. Initial connection and synchronization (402) (Scan state) is achieved using short slots of 2 ms (Scan Hop) on the master (404). The slave changes frequency every 8 ms (406) until it has found or synchronized with its master (408), at which point it hops together with the master at every 2 ms (410) slot until they arrange to move to the Connected state (412). The start of each packet from the master serves as the synchronization reference for the slave. In one embodiment, once synchronized, the slots are lengthened to 4 ms (Connected and Reporting states, or Normal Hop), which allows the use of longer packets.

Alternately (not shown), initial connection and synchronization (Scan state) is achieved using short 4 ms (Scan Hop) slots on the master. The slave changes frequency every 8 ms until it has found its master, at which point it hops together with the master every 4 ms until they arrange to move to the Connected state. The start of each packet from the master serves as the synchronization reference for the slave. In this alternate embodiment, once synchronized, the slots remain at 4 ms (Connected and Reporting states, or Normal Hop), which allows the use of longer packets. In addition to the time slots described above, other time slot configurations can be envisioned by those having the necessary skill in art of implementing a communication protocol, in accordance with the embodiments of the present invention.

Channel Hopping—Scan Hop: Scanning to Synchronizing

In one embodiment, when scanning, the master uses a 4 ms slot time, pinging in the first half and listening for a response in the second half, and then changing to the next frequency in the sequence, as shown in FIG. 4. The slave also hops channels in the same sequence, but changes frequency every 8 ms. The difference in hop rates assures that the master and slave will be using the same frequency roughly every 105 ms. This time can be reduced by scanning on only a subset of the total available frequencies. As set forth above, in addition to the time slots described above, other time slot configurations can be envisioned by those having the necessary skill in art of implementing a communication protocol, in accordance with the embodiments of the present invention.

If the master is pinging with the slave's MID (or with the Proposal ID, and the slave does not detect its own MID), the slave will adjust its hopping clock and slot size to match the master slots, and then acknowledge ("ACK"} the master's ping, as illustrated in the "Synchronizing" diagram, as shown in FIG. 4 (410).

As shown in FIG. 4, the F(j+6) ping is the first master transmission captured by the slave. The F(j+6) ping is the first frequency in this particular example where the master and the slave are respectively sending and receiving at the same time, and the ping is detected by the slave. At F(j+5) the master and the slave are also both on the same frequency at the same time, but the ping packet is not detected by the slave (e.g. due to interference, which is not shown). The slave will not transmit an acknowledgment until it has successfully received at least a certain number of (e.g., two/three) consecutive master pings. After a brief exchange using the 2 ms slot size (starting at t'+13), the master and slave move together to the Connected state and the Normal Hop mode.

Scan Hop Sequence

In one embodiment, the scan state channel hopping sequence is not randomized and both devices just cycle through the channel table (i.e., 0, 1, 2, 3, . . . , 78, 0, 1, 2, 3, . . . ).

Normal Hop

Once synchronization is achieved, the master and slave switch to the Normal Hop 4 ms slot time, as illustrated in the "Connected & Reporting" (412) diagram, shown in FIG. 4.

Normal Hop Sequence

The normal hop sequence is determined by the master device and is dependent on the Marriage ID established by the master device. In one embodiment, the Normal Hop sequence is determined using the low 6 bits of the Marriage ID, such that:

> Channel(next)=Channel((current+HopSkip)MOD 79),
> where:
>
> (HopSkip=Marriage_ID AND 0x3F), meaning that only the last 6 significant bits of the MID are used.

In addition, in certain embodiments, to improve spread spectrum performance, the firmware also checks to make sure that the HopSkip value is no less than 16, to reduce the probability of losing synchronization between the master and slave devices. Some forms of interference will affect multiple adjacent 1 MHz bands (e.g., devices using direct sequence coding), so forcing HopSkip to be greater than a particular value (e.g., 16) helps the master and slave devices to hop away from affected frequencies faster, which reduces the probability of losing synchronization between the master and slave devices.

In one embodiment, the master device always transmits at intervals of 4 milliseconds. The slave device uses the start of the first byte of each host packet as its slot reference time and calculates all other slot-synchronous times from this reference. In the reporting state, the master and slave do not necessarily transmit and/or receive in every slot, which reduces the power consumption of both devices. Other power management aspects of the present invention are described below.

While the communication protocols as set forth above describe exemplary embodiments where the host transceiver unit acts as the broadcaster in initiating a communication link with the human interface device, other embodiments of the present invention include those where the device that initiates the communication link is the human interface device and the initially responding device is the host transceiver unit. In other words, the master device can alternately be the human interface device and the slave device can alternately be the host transceiver unit. These alternate embodiments are also within the scope of the presently claimed invention.

Power Management

Various embodiments of the present invention are directed to the power management features of the wireless peripheral device (slave device). Since the device is wireless, and power is provided by batteries, maximizing battery life is a desired feature, which will provide for a prolonged use between battery replacements and thus enhance usability and hence operator acceptability. The power management aspects are directed to the communication protocol, the power supply and the force feedback devices (e.g., motors) used in the peripheral device.

In one embodiment, the wireless communication protocol is configured to transmit and receive as little as possible in order to conserve battery power. For example, information is sent from the slave device in short bursts instead of using a continuously transmitting protocol, thus having transmission active only for a portion of the time slot available for transmitting from the slave to the master device. In another embodiment, there is a power-down feature between information exchange bursts, wherein the power down feature, which is a power saving feature, is meant to include reducing device power down to a lowered power level such that the device is in a low power or standby mode. In yet another embodiment, a time-out feature automatically switches the device to a sleep mode after an extended period of inactivity. These as well as other power management features are described below in further detail.

Communication Protocol

The communication protocol is designed to transmit and receive as little as possible in order to conserve battery power. As described above, when the master and the slave device are in the connected and reporting mode, information is exchanged between the master and the slave at a periodic rate. For example, in one embodiment where the master and slave are frequency hopping at 8 msec time slots, the host system is sent an updated report from the slave device every 16 msec (the device is bi-directional having 8 msec for transmit and 8 msec for receive). Alternate embodiments use different time slot lengths for communications between the slave and the master devices. For each such reporting the device has a maximum amount of information to send, which in one embodiment includes approximately 200 bits of information. If this information was to be streamed at a rate of 200 bits every 8 msec, this would correspond to a baud rate of 25 kb/sec. However, the transmission rate of the device is designed to be much faster than this rate, and in one embodiment, is set to 250 kb/sec (instead of the 25 kb/sec). Having a transmit rate be approximately 10 times faster than a required data exchange rate means that the transmitter (and the corresponding receiver) need only turn on approximately $\frac{1}{10}$ of the time per each update report. The remainder of the time, the transmitter and receiver are configured to be off or at a reduced power level (e.g. standby or low-power mode), thus resulting in substantial power savings.

In addition to the periodic updating (e.g., at 16 msec) of information from the device to the master, the device is configured to only transmit at the periodic rate only if the device has new information to send. Such new information typically includes button clicks, mini joy stick position information and other operator input actions. If the device has no new information to send, it will transmit at a reduced rate, which is enough to maintain the synchronized frequency hopping link with the host master. For example, the device instead of transmitting information to the host once every 16 msec, it will transmit to the host and receive an "acknowledge" signal from the host once at multiples of the time slot (e.g., every 5 timeslots). This reduced communication rate results in a further reduction in the transmit/receive duty cycle (by another multiplier, e.g., 5 times) during idle periods. The product of the reduced duty cycle and the powering off of the transmitter and receiver during non transmit/receive provides for even more substantial power savings.

In addition to the periodic updating, the short bursts of information exchange and the reduced update rate for idle periods, if the (slave) device is in an idle state for a predetermined time period (e.g., 2 minutes) the processor (e.g., microprocessor or microcontroller) will put the device in a sleep mode. In this mode, the transceiver (transmitter and receiver) and the processor are completely powered down such that the device is using a negligible amount of power from the batteries. For example, in the sleep mode, power is negligibly consumed to monitor the switch matrix for any button input activity. If there is activity, the processor will power itself up completely, power up the transceiver and re-establish the link (i.e., scan and connect) with the master and send the information (that caused the device to "wake up") to the master device. Once awake, the slave device continues to send information at the periodic rates described above, or go back to sleep if the period of inactivity exceeds a predetermined time period, which in one embodiment is set at approximately 2 minutes.

The communication protocol also enables the transmission and reception of information in less than ideal circumstances, such as when for example, information that is transmitted is not fully received due to bad reception conditions. As in any wireless communication, bad reception can be caused by interference, a device going out of range and other known reception problems. The communication protocol is configured for the retransmission of bad data. These retransmissions take place in the "empty" time slots that are ordinarily not used to send data, since information is sent in short bursts at higher rates, yet the device is still in the time slot set aside for transmission. So, instead of sending one packet of information in each direction (to and from the host master) every say 16 msec, there may be anywhere from 1 to more depending on the severity of the interference.

Power Supply

In order to maximize the battery life of the device, certain embodiments of the present invention are specifically directed toward the power supply circuit of the slave device. In one embodiment, the device uses a processor that uses 4.5 Volts to operate. In the same embodiment, the device is powered with a battery pack comprising four AA cells, which when new provide 6 Volts. The battery pack is connected to a voltage regulator to provide a stable voltage as required by the processor, which in this embodiment requires 4.5 Volts. This way, excess battery power in not unnecessarily wasted, thus resulting in power savings and extended battery life. However, once the batteries are depleted to less than 4.5 Volts, they would ordinarily be considered spent. However, the device in accordance with the embodiments of the present invention uses a secondary power supply circuit that boosts a lower voltage (e.g., less than 4.5 Volts) up to a higher voltage level, thus enabling the continued use of the batteries for a much longer period of time; one that would not be possible without the secondary power supply circuit. In one embodiment, the secondary power supply circuit includes a "step-up converter." In the embodiment having a 4.5 Volts microprocessor (or microcontroller) and a 6 Volts power supply, the use of the secondary power supply circuit enables the device to maximize the energy depletion of the batteries, until they are depleted to a much lower level, which is approximately 3 Volts in this embodiment. Thus, the combined use of the voltage regulator and the secondary power supply circuit enable a more efficient and prolonged usage of the device.

Force Feedback Device

Certain embodiments of the device in accordance with the present invention incorporate a force feedback feature. The force feedback enabled device "plays back" or provides a force, vibration or rumble effect to the operator of the device depending on the commands issued by an application or operating system program. Most typically, the force effect is provided by one or more DC motors. As described above, one embodiment of the device uses a power supply circuit providing a voltage range to the device which is between 3V and 6V, where 3V is the point at which the batteries can be considered completely used. Accordingly, the one or more motors are designed to operate over the same voltage range as that provided by the power supply circuit, which is 3V to 6V in an embodiment.

An essential factor in providing an operator with force feedback is to provide a sufficient level of feel to the user. This sufficient level of feel is a rather subjective criterion and one that may be different for different operators. The inventors herein having a high level of knowledge in the design and manufacture of force feedback enabled devices, have determined what a sufficient force level is and have designed the motors so that they generate a force level that is sufficiently satisfactory to the user, while only requiring a minimum available voltage level to generate such a force, which in an exemplary device is a 3V voltage level. This means that for this exemplary device, at 6V, when the batteries are new, they will generate more force than is required, which is a waste of energy. So, to conserve power and extend the useful life of the device between battery replacements, the device firmware is configured to monitor the battery voltage level and scale the drive to the motors to provide just the required force regardless of the battery level. So, for example, when the batteries are fresh and provide a 6V output, while the motors only require a 3V input, the scaling applied to the drive to the motors is approximately 50%. On the other hand, when the batteries are depleted to their minimum (e.g., 3V), the scaling applied is 100%. This combination of monitoring battery level and applying appropriate scaling will result in a substantially constant feeling for the user from the motors as battery voltage decreases over time. So not only, is the battery power not unnecessarily wasted, the force feedback feel that is provided to an operator is sufficiently adequate even when the batteries are nearly maximally depleted.

The scaling back of the power to the motors is enabled by a look up table stored in memory (firmware) that applies an appropriate scaling factor to the motor drives based on the battery level. The use of the firmware as opposed to a voltage regulator to step down the battery power before applying it to the motor drives itself provides additional power savings since a voltage regulator itself is not a 100 percent efficient and thus would undesirably deplete battery life.

In addition to providing the user with a sufficient level of feel at the most reduced battery level, it is also highly desirable to provide the user with sufficient warning when the battery level gets too low, so the user is enabled to stop the application program (or game) at a convenient place before completely losing device functionality due to a low battery level. This diagnostic feedback is provided to the user by way of activating appropriate visual indicators (e.g. LEDs) on the device. Since the firmware is monitoring battery level as described above, and hence knows the state of the batteries, the firmware will cause a warning to be flashed to the user, for example by using a visual indicator (e.g. an LED), when the battery level reaches a predefined level. In addition, the warning flash (e.g., "low battery") may be another signal sent by the device to the host, which may be displayed to the user on the host's display device. If the user then continues to use the device in this "low battery" state, the firmware will at another lower predefined state disable the force feedback devices (e.g., motors). This powering off of the motors is done since the motors are one of the largest power users in the device. The powering off of the motors will give the user an extended period of time during which the user can continue to operate the device to save or stop the application program at a convenient location in the application program; but of course without motor functionality. These diagnostic features provide functionality to the user which is clearly advantageous to simply losing device functionality once the batteries are depleted to too low of a level.

Visual Indicator Behavior

In addition to the power savings embodiments described above, the device's visual indicator(s) (e.g. LEDs) are also designed to enhance the overall power management of the device. In an exemplary embodiment, the device incorporates LEDs to display various status information. Any change in device status (i.e., scanning, synchronizing, connected, sleep, wake, low power, etc.) is communicated to the user by way of briefly turning on a relevant LED and then turning it off again a few seconds later to conserve power.

As will be understood by those skilled in the art, the present invention may be embodied in other specific forms without departing from the essential characteristics thereof. For example, the slave device may include a computer mouse, a joy stick, a gamepad or other human interface device. Furthermore, the particular range of frequencies over which the slave and master devices hop or the particular channel hopping patterns may be different from those specifically described above. These other embodiments are intended to be included within the scope of the present invention, which is set forth in the following claims.

What is claimed is:

1. A system for wireless transfer of data, said system comprising:
   a host transceiver unit configured to be connected with a host device, and configured to wirelessly exchange data with a human interface device;
   a human interface device configured to wirelessly exchange data with the host transceiver unit; and
   computer readable media having instructions thereon, said instructions comprising routines for synchronizing said host transceiver unit and said human interface device for wirelessly exchanging data between said host transceiver unit and said human interface device at a spread spectrum modulation pattern which is determined by said host transceiver unit after said host transceiver unit and said human interface device have acknowledged each other's presence, said instructions further providing a marriage ID, said marriage ID being used by both said host transceiver unit and said human interface device to calculate said spread spectrum modulation pattern, such that subsequent hops in said spread spectrum modulation pattern are not transmitted, but are calculated independently by said host transceiver unit and human interface device,
   wherein said human interface device is configured to broadcast at one of a plurality of different device spread spectrum modulation patterns, each of which is a function of a device communication state, the device communication states including at least a scan state and connected state.

2. The system of claim 1 wherein said spread spectrum modulation is a frequency hopping spread spectrum modulation.

3. The system of claim 1 wherein said spread spectrum modulation is a direct sequence spread spectrum modulation.

4. The system of claim 1 wherein said routines for synchronizing said host transceiver unit and said human interface device comprise the broadcasting of a first signal at a first broadcasting pattern by one of said host transceiver unit and said human interface device in response to powering up one of said host transceiver unit and said human interface device respectively, wherein said first signal is intended to be received by one of said human interface device and said host transceiver unit.

5. The system of claim 4 wherein said first signal comprises a proposal ID signal.

6. The system of claim 1 wherein said routines for synchronizing said host transceiver unit and said human interface device comprise routines for causing said human interface device to switch to broadcasting at a broadcast pattern matching that of the host transceiver unit after a receipt of a signal transmitted by said host transceiver unit by said human interface device, thus synchronizing said host transceiver unit and said human interface device.

7. The system of claim 6 wherein said human interface device transmits an acknowledgment signal to said host transceiver unit after having switched to broadcasting at a pattern matching that of the host transceiver unit.

8. The system of claim 7 wherein said acknowledgment signal includes a signal originally sent by said host transceiver unit.

9. The system of claim 6 wherein said system is configured to transfer data between said host transceiver unit and said human interface device at a second broadcast pattern after said human interface device has synchronized with the host transceiver unit.

10. The system of claim 9 wherein said second broadcast frequency pattern is established by said host transceiver unit.

11. The system of claim 1 wherein said routines for synchronizing said host transceiver unit and said human interface device comprise routines for causing said host transceiver unit to switch to broadcasting at a broadcast pattern matching that of the human interface device after a receipt of a signal transmitted by said human interface device by said host transceiver unit, thus synchronizing said host transceiver unit and said human interface device.

12. The system of claim 1,
   wherein said host transceiver unit is configured to broadcast at one of a plurality of host spread spectrum modulation patterns, each of which is a function of a host communication state;
   said human interface device is configured to broadcasts at one of a plurality of device spread spectrum modulation patterns, each of which is a function of a device communication state; and
   wherein said host transceiver unit and said human interface device broadcast at a same spread spectrum modulation pattern after said host receiver and said human interface device have acknowledged each other's presence.

13. The system of claim 12, wherein said host communication state comprise off, scan, and connected states, and wherein said device communication states comprise sleep, scan and connected states.

14. The system of claim 1 wherein said host transceiver unit and said human interface device wirelessly exchange data over a 2.4 GHz wireless connection.

15. The system of claim 1 wherein said host transceiver unit and said human interface device wirelessly exchange data over a 900 MHz wireless connection.

16. The system of claim 1 wherein said host transceiver unit and said human interface device wirelessly exchange data over a 2.4 GHz spread spectrum wireless connection.

17. The system of claim 1 wherein said host transceiver unit and said human interface device wirelessly exchange data over a 900 MHz spread spectrum wireless connection.

18. The system of claim 1 wherein said host device is selected from the group consisting of a personal computer, a handheld computer, an interactive set-top box, an interactive game console and combinations thereof.

19. The system of claim 1 wherein said human interface device is selected from the group consisting of a computer keyboard, a computer mouse, an interactive game controller, a joy stick, a gamepad, a computer steering wheel, an electronic camera and combinations thereof.

20. A wireless controller configured to establish a wireless link with a host device, said controller comprising:
   a controller transceiver for transmitting data to and receiving data from a host transceiver, wherein said host transceiver is connected with said host device;
   a processor connected with said controller transceiver and configured to process data from said host device and said controller; and
   a computer readable media having instructions thereon, said instructions comprising routines for establishing a spread spectrum modulation pattern, wherein said routines are responsive to signals received from said host transceiver, said instructions further providing a marriage ID, said marriage ID being used by both said host transceiver and said controller to calculate said spread spectrum modulation pattern, such that subsequent hops in said spread spectrum modulation pattern are not transmitted, but are calculated independently by said host device and controller, wherein said controller is configured to broadcast at one of a plurality of different controller spread spectrum modulation patterns, each of which is a function of a controller communication state, the controller communication states including at least a scan state and connected state.

21. A wireless human interface device configured to establish a wireless link with a host, said device comprising:

a transceiver for transmitting data to and receiving data from a host;

a processor connected with said transceiver and configured to process data from said host and said human interface device; and a computer readable media having instructions thereon, said instructions comprising routines for establishing a spread spectrum modulation pattern, wherein said routines are responsive to signals received from said host, said instructions further recognizing a marriage ID from said host, said marriage ID being used by said human interface device to calculate said spread spectrum modulation pattern, such that subsequent hops in said spread spectrum modulation pattern are not transmitted, but are calculated independently by said human interface device, wherein said human interface device is configured to broadcasts at one of a plurality of device spread spectrum modulation patterns, each of which is a function of a device communication state, the device communication states including at least a scan state and connected state; and wherein said human interface device is configured to broadcasts at a same spread spectrum modulation pattern as said host after said human interface device has been acknowledged by said host.

22. The system of claim 1 wherein said human interface device is configured to transmit at a reduced rate within a current spread spectrum modulation pattern when the human interface device is not receiving input from a user.

23. The controller of claim 21 wherein said controller is configured to transmit at a reduced rate within a current spread spectrum modulation pattern when the controller is not receiving input from a user.

* * * * *